United States Patent [19]

Bessho et al.

[11] Patent Number: 4,989,197
[45] Date of Patent: Jan. 29, 1991

[54] APPARATUS FOR PLAYING CARTRIDGE-STORED DISC

[75] Inventors: Akira Bessho; Youichi Konno, both of Tokorozawa, Japan

[73] Assignee: Pioneer Electronic Corporation, Tokyo, Japan

[21] Appl. No.: 193,724

[22] Filed: May 13, 1988

[30] Foreign Application Priority Data

Aug. 6, 1987 [JP] Japan ............... 62-120646

[51] Int. Cl.⁵ .............................. G11B 33/02
[52] U.S. Cl. ...................... 369/77.2; 369/75.2
[58] Field of Search ............ 369/77.2; 360/99.02, 360/99.03, 99.06, 997.0

[56] References Cited

U.S. PATENT DOCUMENTS

| | | |
|---|---|---|
| 184,011 | 8/1981 | Tomita. |
| 197,273 | 2/1979 | Tomita. |
| 209,317 | 12/1986 | Yoshida et al. |
| 4,703,373 | 10/1987 | Oosaka ............... 360/99.02 |
| 4,723,185 | 2/1988 | Maeda ............... 369/77.2 |
| 4,730,296 | 3/1988 | Urata et al. ............... 369/77.2 |
| 4,777,550 | 10/1988 | Taguchi et al. ............... 360/99.06 |

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

An apparatus for playing a disc rotatably stored in a flat protective cartridge has guide pins slidably fitted in guide holes for guiding a holding member that holds the cartridge loaded in a housing toward a turntable. The cartridge can be transferred from a loading/unloading slot toward the turntable with high accuracy. With the arrangement in which the holding member is guided by the guide pins and the guide holes, the apparatus is small in size and the holding member is moved smoothly with a high accuracy thereby to perform smooth loading the cartridge-stored disc while keeping accurate alignment of the disc against the spindle of the turn-table.

4 Claims, 4 Drawing Sheets

APPARATUS FOR PLAYING CARTRIDGE-STORED DISC

BACKGROUND OF THE INVENTION (1) Field of the Invention:

The present invention relates to an apparatus for playing a disc stored in a cartridge.

(2) Description of the Prior Art:

There have recently been developed apparatus for playing discs while they are being rotatably stored in flat cartridges, respectively, for protection purpose. FIGS. 1 and 2 of the accompanying drawings illustrate such a conventional apparatus for playing a cartridge-stored disc.

As shown in FIG. 1, the apparatus has a housing 1 in which a flat support member 2 is disposed at a lower position. The support member 2 supports thereon a playback means including a turntable and a pickup. A guide plate 3 in the form a rectangular plate is fixed to a side end of the support member 2. The terms "left-hand" and "righthand" used below indicate directions as viewed in the direction of the arrow Y, and the term "upward" indicates the direction of the arrow Z. The support member 2 is position to extend in the direction of the arrow Y.

A cartridge holder 4 is disposed upwardly of the support member 2 for holding a flat cartridge 6 in which a disc 5 is rotatably supported. The cartridge 6 can be inserted through a loading/unloading slot 1a defined in the front panel of the housing 1 so that the cartridge 6 can be held by the cartridge holder 4.

A cam member 7 in the form of a rectangular plate is reciprocally mounted on the outer side of the guide plate 3 for back-and-forth movement in the direction of the arrow Y and the direction opposite thereto. The cam member 7 can be driven by a driving force applied by a driving force applying means (not shown).

The cartridge holder 4 has a plurality of legs 4a on which respective pins 4b project, respectively. The pins 4b slidably engage in respective guide slots 3b defined in the guide plate 3 and extending vertically in the direction of the arrow Z and the direction opposite thereto for guiding the cartridge holder 4 vertically. The pins 4b project outwardly from the respective guide slots 3b and also slidably engage in respective cam slots 7a defined in the cam member 7. The cam slots 7a are shaped such that when the cam member 7 is reciprocally moved, the cartridge holder 4 is moved vertically. More specifically, as shown in FIG. 4, when the cam member 7 is moved back in the direction opposite to the direction of the arrow Y, the cartridge holder 4 is guided by the guide plate 3 so as to be lowered for thereby placing the cartridge 6 held by the cartridge holder 4 onto the playback means on the support member 2.

Operation of the aforesaid apparatus for playing a cartridge-stored disc will be described below.

First, the cartridge 6 is inserted through the loading/unloading slot 1a into the housing 1 by the user until it is held by the cartridge holder 4. When the cartridge 6 held by the cartridge holder 4 is detected by a detector (not shown), the support member 2 is moved back in the direction opposite to the direction Y to the position shown in FIG. 1. Arrival of the support member 2 at the rear end of its stroke of movement is detected by another detctor (not shown), whereupon the cam member 7 is then moved back. The cartridge holder 4 is therefore lowered by being guided by the guide slots 3b of the guide plate 3 into the position of FIG. 2. The cartridge 6 is therefore placed on the playback means, which starts playing the disc in the cartridge 6. After the playback operation, the cartridge 6 is moved up and forwardly in the process which is a reversal of the above loading process until the front end of the cartridge 6 projects a certain distance from the loading/unloading slot 1a. The user can now hold the cartridge 6 for retrieval.

In the conventional apparatus for playing a cartridge-stored disc as described above, the pins 4b engaging in the cam slots 7a double as guide pins engaging the guide pins 3b, and the guide plate 3 which is flat and relatively large is required. Therefore, the apparatus is comparatively large in size. Since the guide plate 3 and its guide slots 36b are formed by pressing, the accuracy of their dimensions and positions cannot be inceased substantially, and the cartridge 6 cannot be positioned highly accurately with respect to the turntable.

SUMMARY OF THE INVENTION

In view of the aforesaid difficulties of the conventional apparatus for playing a cartridge-stored disc, it is an object of the present invention to provide an apparatus for playing a cartridge-stored disc, which is smaller in size and can transfer a cartridge highly accurately.

According to the present invention, a transfer mechanism for transferring a cartridge inserted through a slot onto a disc support surface of a turntable comprises a support member supporting thereon a playback means and extending along a path along which the cartridge is transferred from the slot to the turntable, a holding member for holding the cartridge, and a carrier mechanism for carrying the holding member movably with respect to the support member, the carrier mechanism comprising guide means for guiding the holding member movably with respect to the support member in a direction perpendicular to the disc support surface, and positioning means for positioning the holding member selectively in an elevated position and a lowered position, the guide means comprising vertically extending guide pins mounted on one of the support member and the holding member, and guide holes defined in the other of the support member and the holding member for receiving the guide pins respectively therein.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
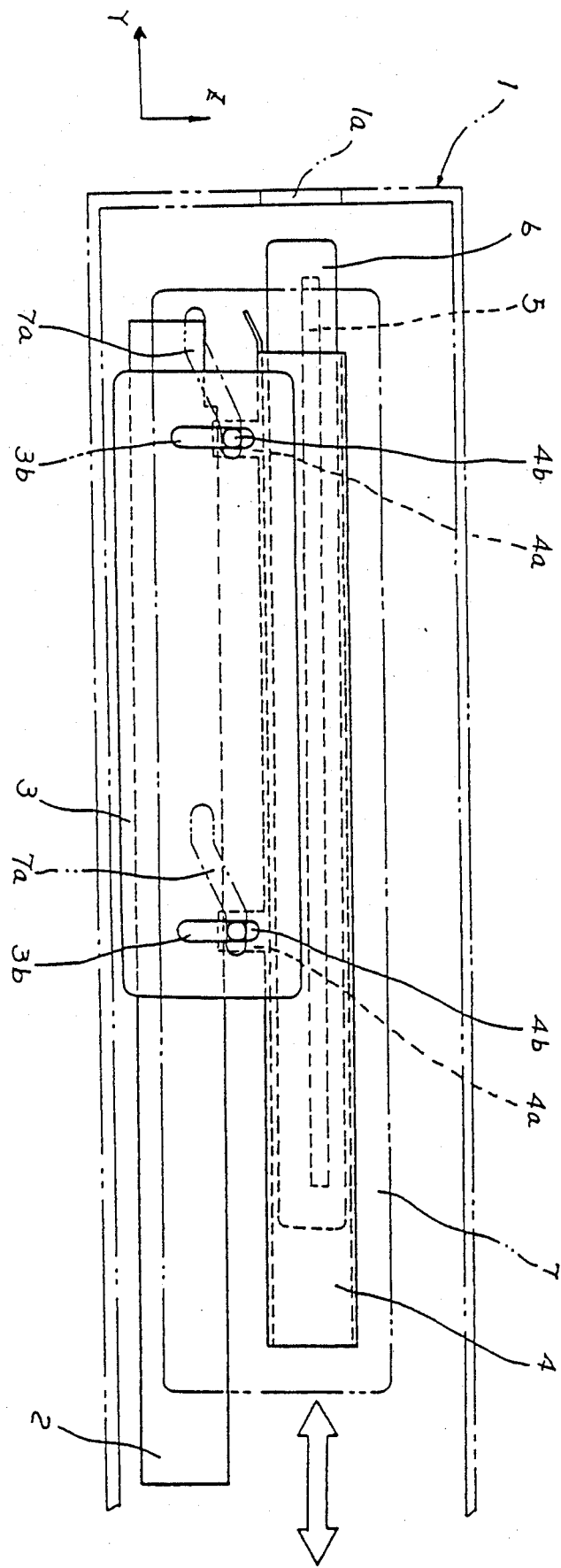
FIGS. 1 and 2 are schematic fragmentary side elevational views of a conventional apparatus for playing a cartridge-stored disc.
Figure 2:
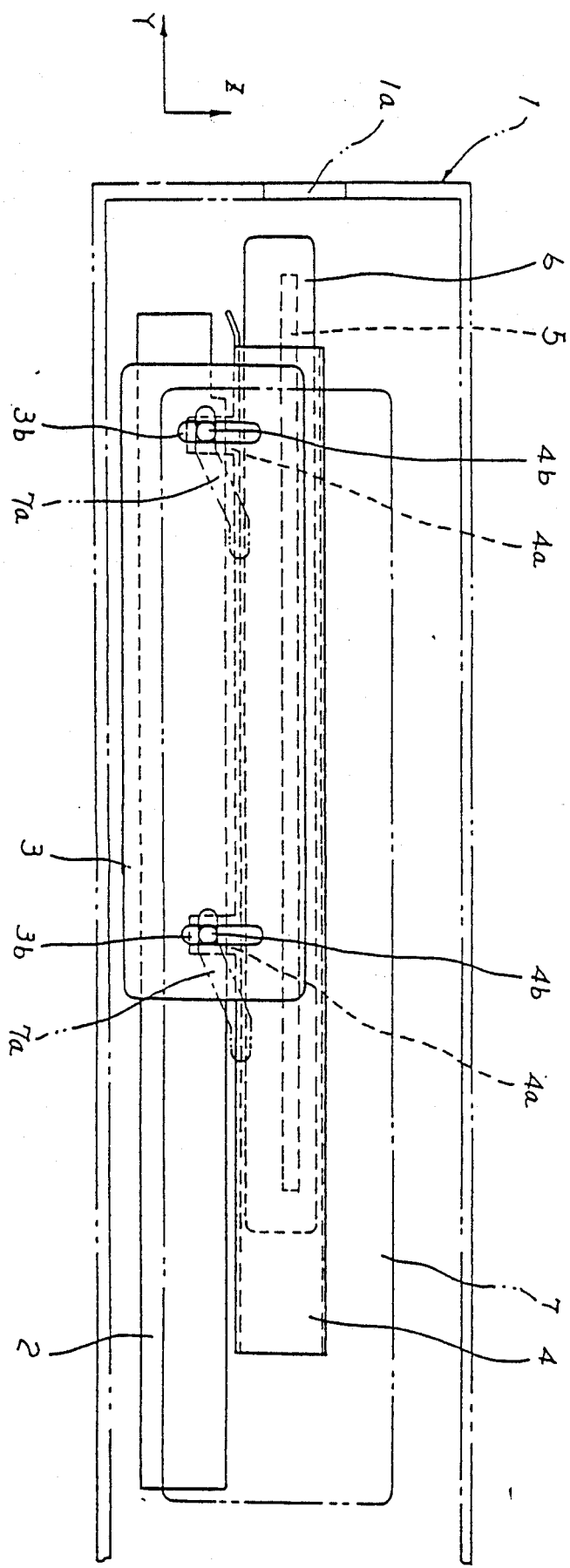

Those parts or components of an apparatus of the present invention other than described below are the same, structurally and in operation, as the corresponding parts or components of the conventional apparatus shown in FIGS. 1 and 2.

Figure 3:
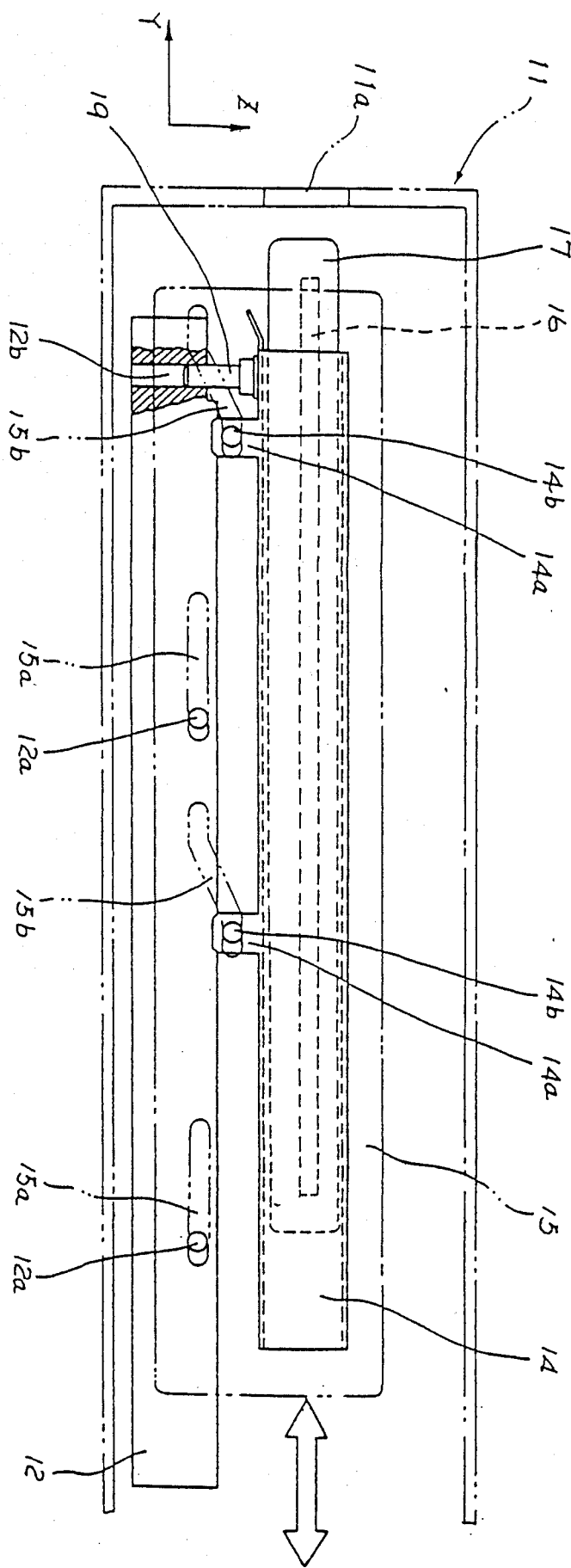
FIG. 3 is a schematic fragmentary side elevational view, partly in cross section, of an apparatus for playing a cartridge-stored disc according to the present invention.

As shown in FIG. 3, the apparatus of the present invention has a housing 11 in which a flat support member 12 is disposed at a lower position. The support member 12 supports thereon a playback means including a turntable and a pickup. A cartridge holder 14 for holding a cartridge is disposed as a holding member above the support member 12. The cartridge holder 14 is in the form of a rectangular parallelepiped in its entirety having upper and lower horizontal side panels parallel to the disc support surface of the turntable and lateral vertical side panels perpendicular to the horizontal side panels, the horizontal and vertical sides extending around a path in which a cartridge is transferred when loaded or unloaded. Adjacent to opposite vertical sides of the support member 12 and the cartridge holder 14, there are disposed cam members 15 (only one shown) each in the form of a rectangular plate extending in the direction of the arrow Y and the direction opposite thereto and movable back and forth in these directions. More specifically, each cam member 15 has two slots 15a defined longitudinally therein in the direction of the arrow Y and the direction opposite thereto. The support member 12 has pins 12a projecting from its opposite sides and slidably engaging in the slots 15a. In FIG. 3, only the cam member 15 on the lefthand side of the support member 12. Actually, the other cam member which is identical in shape and dimensions to the illustrated cam member 15 is disposed on the righthand side of the support member 12. Although not shown, a driving force applying means (not shown) is provided for applying a driving force to drive the cam members 15. The terms "lefthand" and "righthand" used below indicate directions as viewed in the direction of the arrow Y, and the term "upward" indicates the direction of the arrow Z.

The cartridge holder 14 serves to hold a flat rectangular cartridge 17 in which a disc 16 is rotatably stored. The cartridge 17 can be inserted into the housing 11 through a horizontally elongate loading/unloading slot 11a defined in the front panel of the housing 11, until the cartridge 17 is placed in the cartridge holder 14 through an opening defined therein in confronting relation to the slot 11a.

Two elongate guide members (hereinafter referred to as a "guide pin") 19 are mounted on a lower horizontal side of the cartridge holder 14. The guide pins 19 extend in the vertical directions, i.e., the direction of the arrow Z and the direction opposite thereto, in which the cartridge holder 14 is to be guided by the guide pins 19. The two guide pins 19 are disposed parallel to each other near the lefthand and righthand vertical side panels, respectively, of the cartridge holder 14. The support member 12 has guide holes 12b defined vertically therein. The guide pins 19 are slidably fitted respectively in the guide holes 12b for sliding movement along the central axes of the guide pins 19. The guide pins 19 and the guide holes 12b jointly constitute a guide means for guiding the cartridge holder 14 vertically perpendicularly to the disc support surface of the turntable.

The guide pins 19 are mounted on the cartridge holder 14, whereas the guide holes 12b are defined in the support member 12. This arrangement is effective in reducing the number of parts used, because if the cartridge holder 14 which is formed by pressing a steel sheet or the like and is lighweight were provided with guide holes, these guide holes should be defined in a solid block member and the solid block member would have to be mounted on the cartridge holder. By defining the guide holes 12b in the support member 12 which is a solid block member, no such separate block member to be mounted on the cartridge holder is required.

The cartridge holder 14 has two legs 14a on each of the opposite side panels of the cartridge holder 14. Pins extending in the lefthand and righthand directions are mounted on the respective legs 14a. The pins 14b on each side panel slidably engage in two cam slots 15b defined in one of the cam members 15 and spaced from each other in the directions in which the cam member 15 is movable. The cam slots 15b are generally inclined progressively downwardly in the direction of the arrow Y. Therefore, when the cam members 15 move back and forth, the cartridge holder 14 is vertically moved.

The cam members 15 and the driving force applying means for imposing a driving force to the cam members 15 jointly serve as a positioning means for positioning the cartridge holder 14 in either an elevated position or a lowered position. This positioning means and a guiding means including the guide pins 19 for guiding the cartridge holder 14 constitute a transfer mechanism for transferring the cartridge 17 into a playback position on the turntable.

Figure 4:
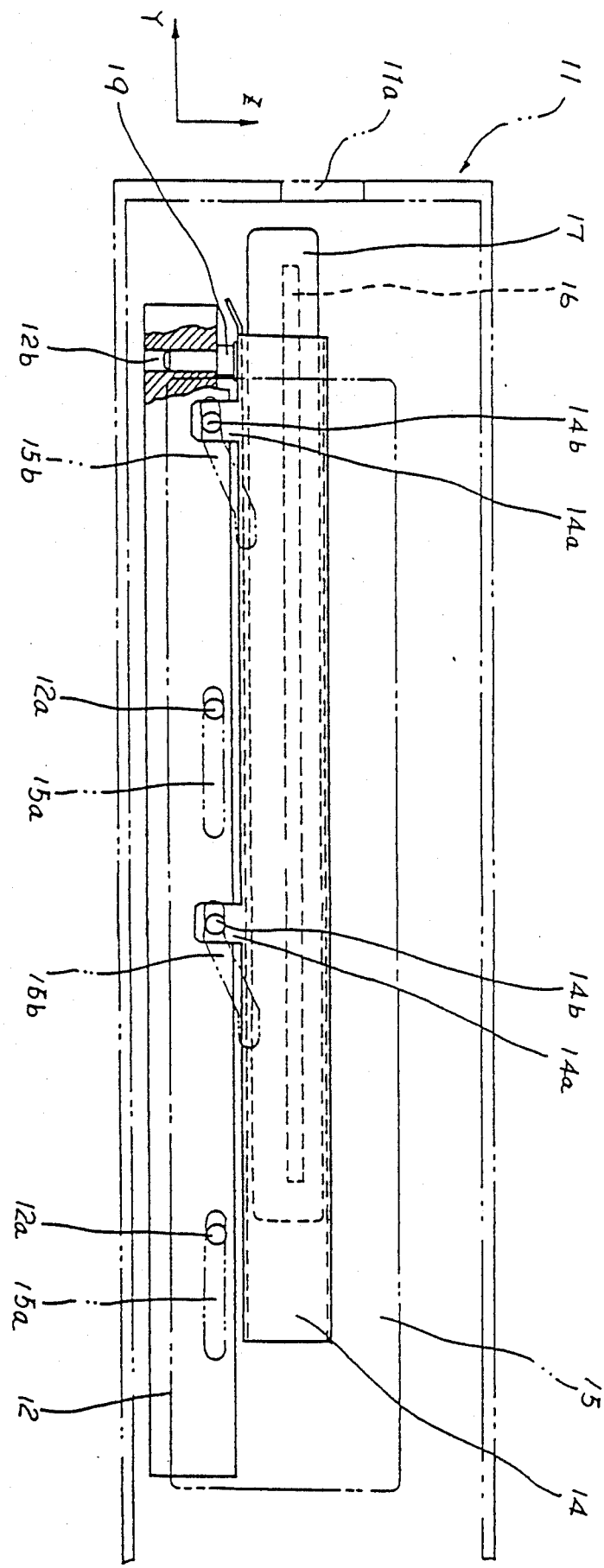
FIG. 4 is a view similar to FIG. 3, showing operation of the apparatus illustrated in FIG. 3.

In operation, when the cam members 15 move from the position of FIG. 3 back into the position of FIG. 4, the cartridge holder 14 is guided by the guide pins 19 and the guide holes 12b to reach the playback position. Since the guide pins 19 and the guide holes 12b are positioned in two pairs near the lefthand and righthand sides of the cartridge holder 14 at the front ends of the cam members 15, the cartridge holder 14 is prevented from wobbling movement in a plane perpendicular to the direction in which the cartridge holder 14 is guided by the guide pins 19 and the guide holes 12b.

In the apparatus of the present invention, the transfer mechanism comprises the support member supporting thereon a playback means and extending along the transfer path leading to the turntable, the holding member for holding the cartridge, and a carrier mechanism for carrying the holding member movable with respect to the support member. The carrier mechanism comprises a guide means for guiding the holding member movably with respect to the support member in a direction perpendicular to the disc support surface of the turntable, and the positioning means for positioning the holding means in either an elevated position or a lowered position. The guide means comprises the vertically extending guide pins disposed on one of the support member and the holding member, and the guide holes defined in the other of the support member and the holding member for receiving the guide pins therein.

Since the holding member for holding the cartridge is guided by the small guide pins and the guide holes, the apparatus of the present invention is smaller in size than the conventional apparatus in which the holding member is guided by the large guide plate.

The guide pins and the guide holes can be machined and positioned highly accurately, and hence the cartridge can be transferred while keeping a desired alignment of the disc with respect to the turn-table or clamp members.

Although a certain preferred embodiment has been shown and described, it should be understood that many changes and modifications may be made therein without departing from the scope of the appended claims.

We claim:

1. An apparatus for playing a disc rotatably stored in a cartridge, comprising:
   a housing having a slot for passing the cartridge therethrough;
   playback means disposed in said housing for playing the disc, said playback means including a turntable having a disc support surface; and
   a transfer mechanism for transferring the cartridge inserted through said slot onto said disc support surface of said turntable, said transfer mechanism comprising:
      a stationary support member supporting thereon said playback means;
      a holding member for holding the cartridge above said support member; and
      a carrier mechanism for carrying said holding member movably with respect to said stationary support member between an elevated position and a lowered position,
   said carrier mechanism including guide means for guiding said holding member movably with respect to said support member in a first direction perpendicular to said disc support surface, and positioning means for positioning said holding member selectively in the elevated position and the lowered position,
   said guide means having at least one pair of guide pins extending vertically and downwardly in said first direction perpendicular to said disc support surface from said holding member, and at least one pair of guide holes defined in said stationary support member for receiving said guide pins respectively therein, said at least one pair of guide pins being retained in said at least one pair of guide holes during movement between the elevated position and the lowered position and said at least one pair of guide pins residing within said at least one pair of guide holes in both the elevated position and the lowered position for a stabilized positioning of said holding member at and between the elevated position and the lowered position.

2. An apparatus according to claim 1, wherein said holding member has two vertical side panels extending in said first direction, said positioning means comprising a pair of cam members supported on said support member movably parallel to said vertical side panels of the holding member, each of said cam members having a pair of cam slots defined therein, and two pairs of pins projecting respectively on said vertical side panels and engaging said cam slots, respectively.

3. An apparatus according to claim 1, wherein said holding member has two horizontal side panels extending parallel to said disc support surface, said guide pins being disposed spatially from each other on opposite ends of one of said horizontal side panels.

4. An apparatus according to claim 2, wherein said holding member has two horizontal side panels extending parallel to said disc support surface, said guide pins being disposed spatially from each other on opposite ends of one of said horizontal side panels.

* * * * *